March 17, 1964   F. F. SMITH ETAL   3,125,066
MILKING MACHINE ANALYZER

Filed Oct. 23, 1961   3 Sheets-Sheet 1

INVENTORS:
FRANCIS F. SMITH
MAURICE S. BECKLEY
BY
*Mellin and Hanscom*
ATTORNEYS

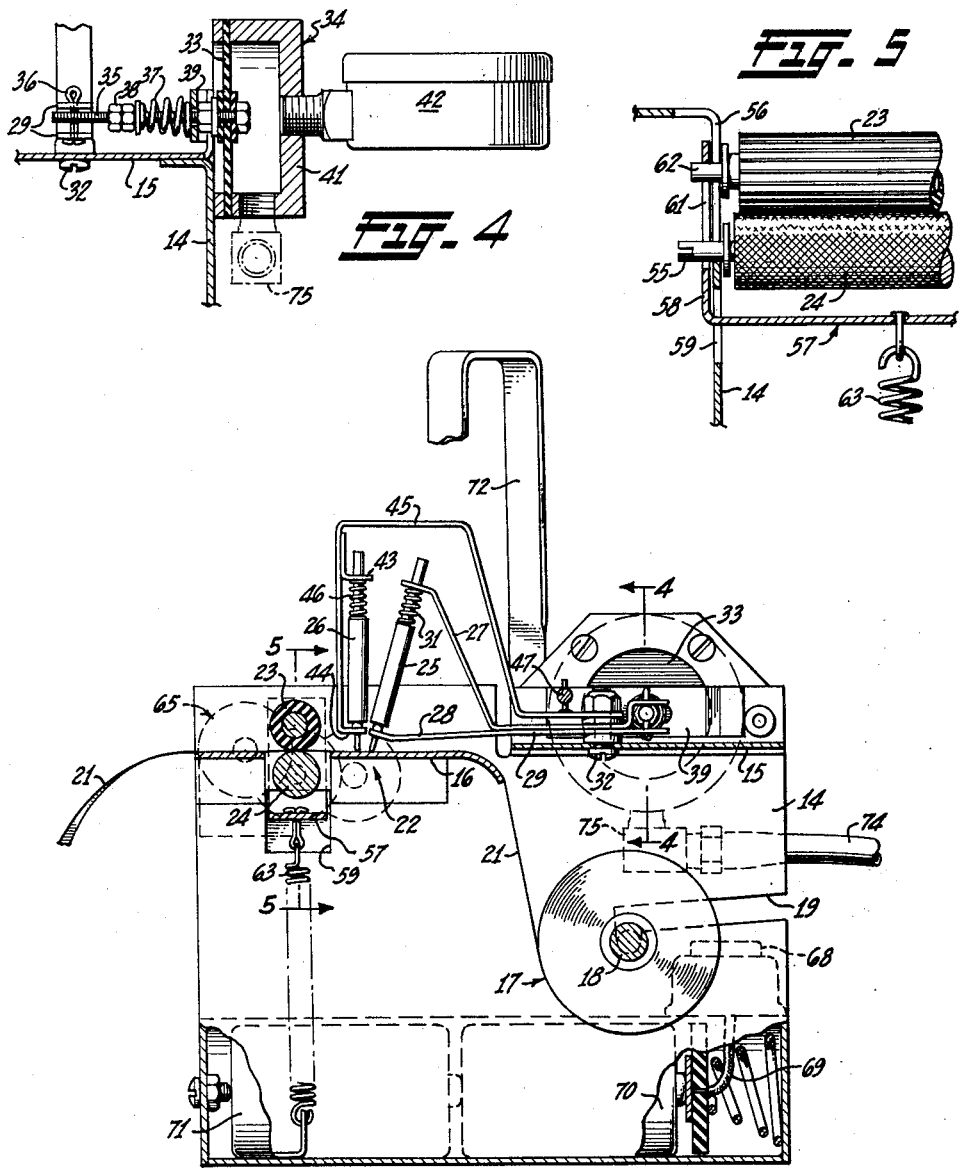

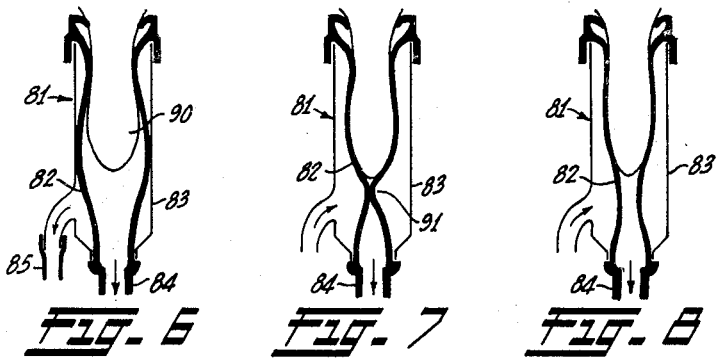
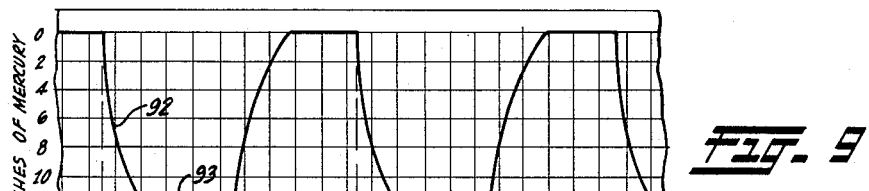
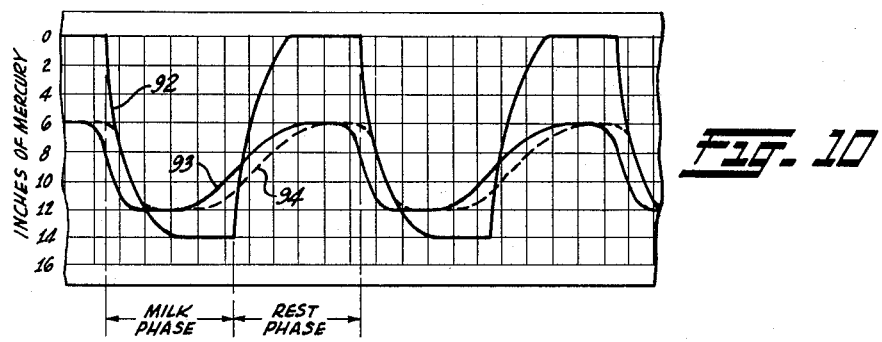
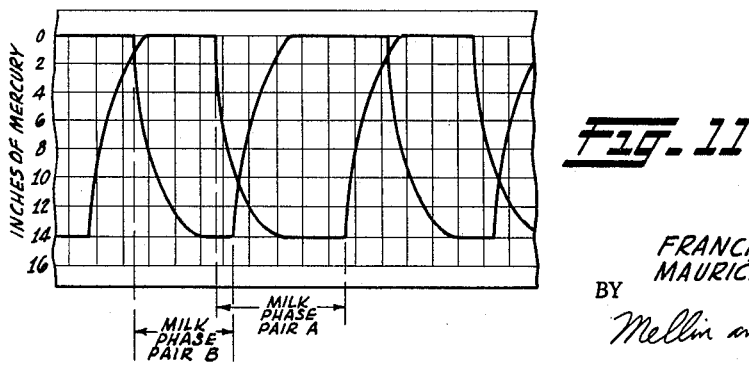

United States Patent Office 3,125,066
Patented Mar. 17, 1964

3,125,066
MILKING MACHINE ANALYZER
Francis F. Smith, Saratoga, and Maurice S. Beckley, San Jose, Calif., assignors to Dairy Equipment Testing Company, Inc., San Jose, Calif., a corporation of California
Filed Oct. 23, 1961, Ser. No. 146,888
5 Claims. (Cl. 119—14.14)

This invention relates generally to milking machines and more specifically to a recording device wherein the vacuum levels of a milking machine may be recorded and analyzed.

The present day milking machine causes milk to flow from the udder of a cow through the application of a subatmospheric pressure at the teat orifice, with the pressure being generally in the order of 10 to 14 inches of mercury. A constant suction of this magnitude is highly injurious to delicate teat tissue. For this reason, teat cups have been developed comprising a flexible liner within a rigid shell, the teat being received within the liner which, in turn, is connected to a source of steady vauuum. The space between the teat cup shell and liner is then connected to a source of pulsating vacuum. When this space is exposed to atmospheric pressure, the liner will collapse on the teat; when a vacuum is applied to this space, the liner will relax from the teat, allowing vacuum to be re-applied at the teat orifice. The purpose of the rhythmic collapse against the teat by the pulsating vacuum is to permit the blood and body fluids of the cow to remain in circulation. If this squeeze or massage is not adequate, the teat will become congested with blood and irritation and inflamation will result.

The mechanism causing the intermittent collapse of the teat cup liner is generally referred to as the pulsator. Recording devices have been developed which record the levels of the pulsating vacuum applied through the pulsator to the space between the teat cup shell and liner. Since the standards of pulsator performance are generally established and accepted in the dairy industry, an interpretation of the recorded curves enables the operator to detect worn, sticking or overloaded pulsators, which deficiencies have a profound influence on the milking process and particularly on the matter of udder irritation and infection. After detection of these problems, the pulstaors can be repaired or replaced to restore the pulsator to proper operation.

However, in spite of good pulsator performance, it often happens that irritating conditions persist. Since the strength and effectiveness of the massaging action is dependent upon the relation between the vacuum levels on both sides of the teat cup liner, it is possible that improper massaging will occur, even though the pulsator is operating properly, if the constant vacuum level during the period of teat cup liner collapse is insufficient to collapse the liner properly. Accordingly, to properly evaluate machine operation, it is necessary to examine not only the operation of the pulsator, but also of the simultaneous relationship between the vacuum levels inside and outside of the teat cup liner.

Therefore, it is an important object of this invention to provide an analyzing device for simultaneously recording the pulsated vacuum level and the constant vacuum level of a milking machine teat cup.

Another object of the invention is to provide a relatively inexpensive analzying device in order that the use thereof will be widesperad.

Another object of the invention is to provide an analyzing device that is highly portable, since it must be taken directly to the point of use of each set of teat cups of a milking machine.

A further object of the invention is to provide an analzying device which is easy to operate by an average dairy worker without prolonged instruction.

Another object of the invention is to provide a self-powered analyzing device. Milking barns invariably have wet floors, which leads to the danger of shock if the analyzer is powered by the electrical system of the barn.

Other objects and advantages of the invention will become apparent in the course of the following detailed description.

Referring now to the drawings, in which like parts are designated by like reference numerals throughout the same:

FIG. 3 is a sectional elevational view of the recording device, taken on line 3—3 of FIG. 2;

FIG. 4 is a sectional detail of one of the recording pen actuators, taken on line 4—4 of FIG. 3;

FIG. 5 is a sectional detail in elevation, illustrating the manner in which the feed rolls are mounted;

FIGS. 6–8 are diagrammatic illustrations of the action of a teat cup during the milking process;

FIG. 9 illustrates simultaneous recordings taken by the recording device of the steady vacuum in the liner of a teat cup and of the pulsating vacuum in the space between the teat cup shell and liner, which record indicates proper operation of the milking machine;

FIG. 10 is a recording similar to that in FIG. 9, illustrating poor operation of the milking machine; and FIG. 11 illustrates simultaneous readings taken by the recording device of the pulsating vacuum levels in each pair of teat cups of a milking machine which milks two teats at a time.

Figure 1:
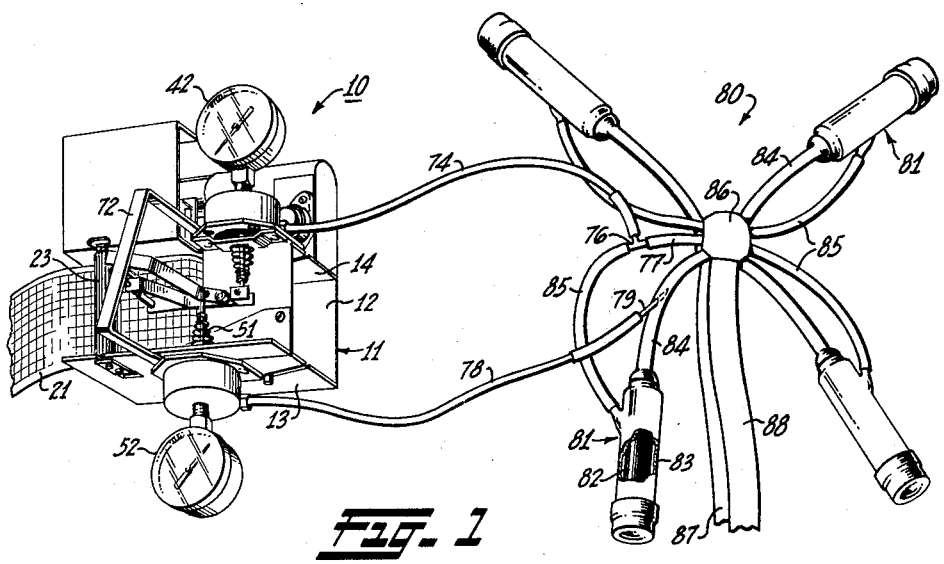
FIG. 1 is a perspective view of the recording device as viewed generally from above and as connected to a vacuum-operated milking machine.
Figure 2:
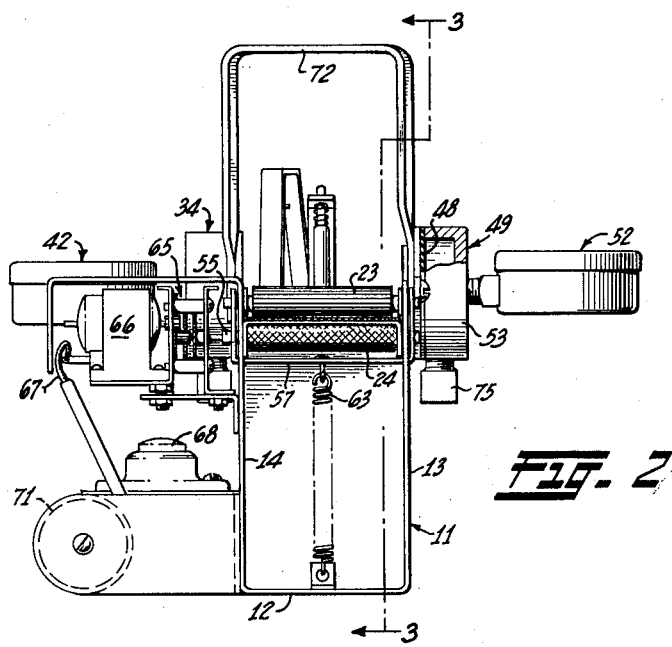
FIG. 2 is an end elevational view of the recording device.

In general, the vacuum recorder of this invention is an easily portable device designed to be connected directly to the teat cup cluster of any unit of a milking machine. Two recording pens are mounted in correlated position in the device for independent movement adjacent each other at a recording station so as to mark on an endless strip of tape which is moved past the recording station by a battery-operated motor.

Each recording pen is operated by a vacuum-actuated diaphragm device. One of these latter is connected by a conduit to the constant vacuum in the teat cup liner while the other is connected to the pulsating vacuum applied to the space between the teat cup liner and shell.

When in operation, one of each recording pens will be instantaneously and respectively following the constant and pulsating vacuum levels in a teat cup, and these levels will be simultaneously recorded on the recording tape to give an indication of the operation of each vacuum level by itself and relative to the other level. From these indications, it can be determined whether the milking machine is operating properly or not. If not, the machine may then be adjusted to give proper operation.

The recording device generally indicated by the reference numeral 10 comprises a frame 11 having a base 12, side walls 13 and 14 and top deck members 15 and 16. A roll of tape 17, supported between the side walls on a spindle 18 disposed in the side wall slots 19, unwinds so that the tape web 21 passes over the top deck member 16 past the recording station 22 between the feed rollers 23 and 24 and out the back of the machine.

The recording pens 25 and 26 are mounted for movement across the width of the tape web 21 at the recording station 22. These pens can be of the ball point pen variety, although any other type of marking device could be used, if desired.

Pen 25 is inserted in holes in the bifurcated ends 27 and 28 of lever arm 29, and is biased downwardly by spring 31 into engagement with the tape web. The lever arm 29 is pivotally mounted on screw 32 secured to top deck member 15.

The lever arm 29 is designed to be pivoted about screw 32 in response to movement of diaphragm 33 of the subatmospheric pressure-sensitive device 34, by means of the connecting rod 35, which is secured at one end thereof by cotter pin 36 to lever arm 29 and at its other end to the diaphragm, as best seen in FIG. 4. Spring 37, confined between nuts 38 on rod 35 and frame bracket 39, biases the rod to the left (FIG. 4) so that the recording pen 25 will be normally at rest at one side of the tape web 21.

As may be seen from the drawings, diaphragm 33 is exposed to atmospheric or ambient pressure at all times. If the pressure within the casing 41 of device 34 is reduced, the diaphragm 33 will flex inwardly, causing the rod 35 to move to the right against the bias of spring 37. The amount of rod movement against the bias of the spring will, of course, be proportional to the magnitude of the difference between the pressures on each side of diaphragm 33. Accordingly, pen 25 will be moved in a counterclockwise direction across the tape web a distance proportional to the magnitude of the subatmospheric pressure within device 34.

A standard vacuum indicating gauge 42 is connected to casing 41 of the pressure-responsive device 34 to give an instantaneous visual indication of the pressure therein.

Recording pen 26 is similarly mounted. The ends thereof are held by bracket elements 43 and 44 of lever arm 45. Spring 46 biases pen 26 downwardly into marking engagement with tape web 21.

Lever arm 45, also pivotally mounted on screw 32, is connected by rod 47 to diaphragm 48 of the subatmospheric pressure-responsive device 49. Spring 51 biases lever arm 45 in the same manner as above described so that the pen 26 is at rest adjacent the point of pen 25. Gauge 52 is connected to casing 53 of device 49.

When device 49 is connected to a source of subatmospheric pressure, the diaphragm 48 thereof will flex inwardly against the bias of spring 51 to rotate lever arm 45 and pen 26 counterclockwise around screw 32.

The tape web 21 is fed past the recording pens 25 and 26 by feed rollers 23 and 24. As best seen in FIG. 5, the lower roller 24, extending between side walls 13 and 14, has its spindle 55 disposed in the bottom of side wall slots 56 for rotation therein. A yoke 57, extending between side walls 13 and 14, is turned upwardly, as at 58, after passing through side wall windows 59. The upturned portion is slotted at 61 for the reception of upper feed roller spindle 62 thereinto. By this arrangement, the lower feed roller 24 rotates about a fixed axis, while the upper feed roller and yoke are free to move upwardly relatively thereto. Spring 63, secured between the yoke 57 and base 12, biases the upper feed roller downwardly against the lower feed roller.

As illustrated, the lower feed roller has a knurled surface and the upper feed roller is provided with a longitudinally ribbed rubber surface to grip the tape web 21 therebetween.

The spindle of the lower feed roller is connected by speed-reducing gears 65 to motor 66. The latter may be any one of the many small battery-operated motors which are currently commercially available. One side of the motor winding is grounded to the frame while the other end of the winding is connected by wire 67 to pushbutton switch 68 and then by wire 69 to the positive pole of flashlight battery 70. Battery 71 has the shell, or negative terminal, thereof grounded to the frame to complete the motor winding circuit.

A carrying handle 72 is attached to the recording device for convenience in carrying the device from one point to another.

The recording device 10 further includes conduit means for connecting the device to a milking machine. The connection for the pulsating vacuum of the milking machine consists of a flexible hose 74 connected at one end thereof by fitting 75 to casing 41 of the subatmospheric pressure-responsive device 34. The other end of hose 74 terminates at a T-fitting 76 which has a hose 77 secured to one of the branches thereof.

In generally like manner, the subatmospheric pressure-responsive device 52 has a flexible hose 78 connected thereto. The other end of the hose terminates in a hypodermic needle 79.

FIG. 1 illustrates the recording device as connected to a conventional milking machine 80. The four teat cups 81, each having a flexible liner 82 disposed inside a rigid shell 83, are connected by hoses 84 and 85 to the claw 86. Conduits 87 and 88 connect the claw 86 to sources of constant and pulsating vacuum (not shown), respectively. In operation, a constant vacuum will be exerted within the liner 82 through hose 84 whereas hose 85 will connect the space between the shell and liner to the pulsating vacuum.

In connecting the recorder to one of the teat cups, the teat cup hose 85 is pulled from the claw 86 and is connected to the T-fitting 76. The hose 77 is then connected to the claw, thus placing the interior of pressure-responsive device 42 at the same pressure as the space between the shell and liner of the teat cup. Hypodermic needle 79 is inserted into the teat cup hose 84 to place the interior of device 52 at the same pressure as the interior of teat cup liner 82.

In making a recording of the operation of the milking machine 80, the recording device is brought to a milking station and is connected to the milking machine as above described. The teat cups are then attached to the cow and put into operation. The recording pens will follow the teat cup pressures at all times until the device is detached from the milking machine. To make a recording, the operator presses pushbutton 68 to energize the motor and drive the feed rollers. After a sufficient number of pulsations have been recorded, the motor is stopped. The recorded tape web is then removed and analyzed to see if the milking machine is working properly.

FIGS. 6–8 illustrate proper and improper action of a teat cup during a milking process. FIG. 6 indicates the position of the teat cup liner during a milking phase of a cycle, that is with vacuum applied to the teat cup at both hoses 84 and 85 so that the pressure inside and outside of the liner 84 is essentially the same. The vacuum in the hose 85 is applied to the orifice in teat 90 to draw milk therefrom.

During this phase of the cycle, the vacuum applied to the teat will also cause blood to flow into the teat, which congestion, if unrelieved, would be injurious to the cow. To overcome this, the vacuum in the space between the shell and liner is interrupted and this space is allowed to come to atmospheric pressure. This pressure on the outside of the liner and the vacuum on the inside of the liner cause the liner to collapse on the teat as shown in FIG. 7. As will be noted, the walls of the liner meet at 91 to relieve the lower end of the teat from the suction in hose 84. The combined pressure on the teat and the interruption of the vacuum on the teat orifice allow the blood to flow from the teat. The circulation of blood to and from the teat thus prevents congestion.

FIG. 7 represents the desirable operation of the teat cup during the rest portion of a cycle. However, oftentimes the difference in vacuum levels inside and outside of the liner may cause undesirable operation during the rest phase of the cycle, as indicated in FIG. 8, wherein the space between the shell and liner is at atmospheric pressure. If the vacuum within the liner is too low, the liner will not collapse sufficiently to close itself so that the vacuum on the teat orifice is relieved. Thus, the teat remains under suction at all times, which, coupled with an inadequate positive pressure on the teat, causes undesirable congestion.

This latter condition can occur even though the pulsator is operating perfectly. Thus, this situation would remain undetected if the performance of the milking machine were observed with presently availabel analyzing devices. However, by the use of the present invention, theerin the pressure inside and outside of the teat cup liner may be recorded simultaneously, a much truer determination of operation may be made.

FIG. 9 illustrates a recording made by the present invention of a milking machine in good operation. Curve 92, indicating the pulsating vacuum, is recorded by pen 25, and curve 93, indicating the steady vacuum, is recorded by pen 26. The milking phase of the cycle, as indicated, begins when vacuum is applied to the space between the liner and shell through hose 85 and ends when this vacuum is relieved. Similarly, the rest phase starts with the relieving of the vacuum in the shell-liner space and ends with the reapplication of vacuum thereto. A 55/45 ratio of the milking to the rest phases is generally accepted as a desirable and efficient operation. A measurement of the milking and rest phases of the recording 92 of FIG. 8 indicates quickly whether the pulsator alone is functioning properly to produce such desired results. The level of the pulsated vacuum can also be quickly determined from the recording. In the particular recording illustrated, the milking/resting ratio is approximately 50/50 and the pulsated vacuum varies between 0 and 14 inches of mercury, both of which are well within acceptable limits for normal use.

FIG. 9 also illustrates the recording 93 of the vacuum within the liner 84, which is indicated as being at a relatively constant value at about 12 inches of mercury. The two curves, taken together, thus indicate that the teat is subjected to a suction of 12 inches of mercury for half of the cycle during the milking phase and is subjected to a positive pressure of 12 inches of mercury during the rest phase. This balance of forces in magnitude and time assures that the massage on the teat is sufficient to prevent undesirable congestion.

FIG. 10, on the other hand, illustrates a recording of an improperly operating milking machine. As will be noted, the curve of the pulsated vacuum is substantially the same as that in FIG. 9; i.e., the milking to rest ratio is 50/50 and the pulsated vacuum varies between 0 and 14 inches of mercury, indicating that the pulsator is working normally. If the milking machine operation were judged by this factor alone, it would be assumed that the machine were operating properly. However, the true operation can be detected by analyzing the vacuum levels inside and outside of the teat cup liner. As here indicated, the constant vacuum inside the liner varies from 12 to 6 inches of mercury during each cycle of operation. The variations in the constant vacuum can be produced by a wide variety of circumstances; i.e., large compressible areas within the bore of the liner, restricted hoses, flooding hoses, leaks in hoses, too many units connected to the vacuum pump, teat cups dropping off and so on. Most of these conditions will be undetected at the vacuum pump and the gauge there will give the operator the impression that all units of the machine are operating properly.

In FIG. 10 the curves 92 and 93 show that during the milking phase a negative pressure, having a maximum value of about 12 inches of mercury, is being exerted on the teat, whereas during the rest cycle, a positive pressure of as little as 6 inches of mercury is applied to the teat cup liner to compress the teat and force the blood therefrom. This imbalance in positive and negative pressures on the teat gives an improper massage and creates congestion in the teat, which is highly deleterious. Also, the positive pressure of only 6 to 8 inches of mercury on the teat cup liner will be insufficient to close the liner (as in FIG. 8) which will subject the teat orifice to an undesired unrelieved vacuum.

Due to the spacing of the recording pens, the curve of the constant vacuum will precede the curve of the pulsated vacuum. If it is desired to know the exact difference in level between the constant and pulsated vacuum at any given instant in the cycle, the operator will have to translate one curve on the recording a distance equal to this spacing; i.e., as shown in dotted line 94 on FIG. 10. Obviously, the nearer the pens are to each other, the less translation of one curve is necessary. However, in most instances, it is unnecessary to find the exact amount of difference in the vacuum levels at any given instant, since the general shape of the curves can be inspected for malfunctioning, and the maximums and minimums of the vacuum levels will be unchanged.

Although in FIG. 10 the pulsator is indicated as operating properly, it is obvious that should there be any defects in pulsator operation, such defects will be revealed by inspection of curve 92. For example, the milking to rest ratio will be immediately apparent and the vacuum level during the milking phase will be readily observable.

The present invention has a further significant use in the analysis of milking machines of the type wherein two teats are milked at a time. FIG. 11 illustrates a recording made of such a machine, with the vacuum-responsive devices 42 and 52 of the recording device each being connected to the space between the teat cup liner and shell of a teat cup of each pair thereof. In these machines unbalanced conditions are not uncommon and are a source of trouble if undetected. The curves of FIG. 11 indicate improper operation since the pair A teats would milk out in about 75 percent of the time required for pair B. If pair B is not milked, further production will be lost. If pair B is milked further, pair A will be damaged. However, with a recording of FIG. 11 made on the machine, the unbalance can be detected and steps taken to correct the difficulty so as to restore the machine to proper operating condition.

It is to be understood that the invention herein illustrated and described is to be taken as a preferred embodiment of the same and that various changes may be made in the shape, size and arrangement of parts without departing from the spirit of the invention or the scope of the attached claims.

Having thus described our invention, what we claim and desire to secure by Letters Patent is:

1. Apparatus for analyzing the operation of automatic milking machines in which the teat cups of the milking machine each has a flexible liner disposed within a shell and in which the interior of said liner is connected by a hose to a source of constant subatmospheric pressure and the space between the liner and shell is connected to a pulsating source of subatmospheric pressure, said apparatus comprising: means for moving a tape past a recording station, first and second marking members engageable with said tape at said recording station, first and second mounting means mounting said first and second marking members respectively for independent movement across the same width of said tape in close adjacency to each other, means inserted into the interior of a teat cup liner hose and responsive to the subatmospheric pressure therein for actuating said first mounting means to move said first marking member across said tape a distance proportioned to the degree of said subatmospheric pressure, and means connected to the space between a teat cup liner and shell and responsive to the subatmospheric pressure therein for actuating said second mounting means to move said second marking member across said tape a distance proportional to the degree of said subatmospheric pressure.

2. Apparatus for analyzing the operation of automatic milking machines having teat cups and comprising a flexible liner within a shell and in which the interior of the liners and the spaces between the liner and shell are connected by hoses to sources of steady and pulsating subatmospheric pressure respectively, said apparatus comprising: means including an interconnected battery and battery-operated motor for moving a tape web past a recording station, first and second marking members engageable with said tape at said recording station, first and second mounting means mounting said first and second marking members respectively for independent movement in close adjacency to each other across the same width of said tape, first and second pressure responsive devices, each having a flexible member exposed on one side thereof to atmospheric pressure, means connecting said first and second mounting means to said flexible members of said first and second pressure responsive devices respectively for movement thereby, and means for fluidly connecting the other side of the flexible member of said first and second indicating member to the interior of the hoses leading to the liner and the space between the liner and shell of one of said teat cups respectively.

3. Apparatus for analyzing the operation of automatic milking machines, comprising: a teat cup having a flexible liner disposed within a shell, means for connecting the interior of said liner to a source of constant subatmospheric pressure, means for connecting the space between the liner and shell to a pulsating source of subatmospheric pressure, means for moving a tape web past a recording station, first and second marking members engageable with said tape web at said recording station, first and second mounting means mounting said first and second marking members respectively for independent movement across the width of said tape in close adjacency to each other, means responsive to subatmospheric pressure in the interior of said teat cup liner for actuating said first mounting means to move said first marking member across said tape a distance proportional to the degree of said subatmospheric pressure, and means responsive to subatmospheric pressure in the space between said teat cup liner and shell for actuating said second mounting means to move said second marking member across said tape a distance proportional to the degree of said subatmospheric pressure.

4. Apparatus for analyzing the operation of automatic milking machines, comprising: a teat cup having a flexible liner disposed within a shell, means for connecting the interior of said liner to a source of constant subatmospheric pressure, means for connecting the space between the liner and shell to a pulsating source of subatmospheric pressure, means including an interconnected battery and battery-operated motor for moving a tape web past a recording station, first and second marking members engageable with said tape at said recording station, first and second mounting means mounting said first and second marking members respectively for independent movement across the same width of said tape in close adjacency to each other, first and second pressure responsive devices each having a flexible member exposed on one side thereof to atmospheric pressure, means connecting said first and second mounting means to said flexible members of said first and second pressure responsive devices respectively for movement thereby, conduit means fluidly connecting the other side of the flexible member of said first pressure responsive device to the interior of said teat cup liner, and conduit means fluidly connecting the other side of the flexible member of said second pressure responsive device to the space between said teat cup liner and shell.

5. Apparatus for analyzing the operation of automatic milking machines, comprising: first and second teat cups each having a flexible liner disposed within a shell, the interiors of said liners being connectable to a source of constant subatmospheric pressure, the spaces between the liner and shell of said teat cups being alternately connectable to a pulsating source of subatmospheric pressure, means including an interconnected battery and battery-operated motor for moving a tape past a recording station, first and second marking members engageable with said tape at said recording station, first and second mounting means mounting said first and second marking members respectively for independent movement across the same width of said tape in close adjacency to each other, means responsive to subatmospheric pressure in the space between the liner and shell of said first teat cup for actuating said first mounting means to move said first marking member across said tape a distance proportional to the degree of said subatmospheric pressure, and means responsive to subatmospheric pressure in the space between the liner and shell of said second teat cup for actuating said second mounting means to move said second marking member across said tape a distance proportional to the degree of said subatmospheric pressure.

References Cited in the file of this patent

UNITED STATES PATENTS

| | | |
|---|---|---|
| 1,010,203 | Umrath | Nov. 28, 1911 |
| 1,309,531 | McAdie | July 8, 1919 |
| 1,411,698 | Hepler | Apr. 4, 1922 |
| 1,656,134 | Birkett | Jan. 10, 1928 |
| 2,572,518 | Redin et al. | Oct. 23, 1951 |
| 2,594,136 | Di Maggio | Apr. 22, 1952 |
| 2,612,136 | Davis | Sept. 30, 1952 |